(12) United States Patent
Huppert

(10) Patent No.: US 7,841,126 B2
(45) Date of Patent: Nov. 30, 2010

(54) MODULAR SINKER

(76) Inventor: Mikel Huppert, 1327 Debra St., Ellsworth, WI (US) 54011

(*) Notice: Subject to any disclaimer, the term of this patent is extended or adjusted under 35 U.S.C. 154(b) by 39 days.

(21) Appl. No.: 12/082,061

(22) Filed: Apr. 8, 2008

(65) Prior Publication Data

US 2009/0249679 A1 Oct. 8, 2009

(51) Int. Cl.
*A01K 95/00* (2006.01)
(52) U.S. Cl. .................................... 43/43.14
(58) Field of Classification Search ............. 43/44.87, 43/42.06, 42.09, 42.31, 43.1, 44.96, 43.14; *A01K 95/00, A01K 95/02*
See application file for complete search history.

(56) References Cited

U.S. PATENT DOCUMENTS

| | | | | |
|---|---|---|---|---|
| 2,640,292 A | * | 6/1953 | Nadolny | 43/41 |
| 3,468,053 A | * | 9/1969 | Lux | 43/42.31 |
| 3,762,092 A | * | 10/1973 | Bercz et al. | 43/17.6 |
| 4,202,128 A | * | 5/1980 | Hill et al. | 43/43.14 |
| 4,879,831 A | * | 11/1989 | Herrlich | 43/17.6 |
| 5,001,856 A | * | 3/1991 | Gentry | 43/42.31 |
| 5,517,782 A | * | 5/1996 | Link et al. | 43/42.31 |
| 6,199,312 B1 | * | 3/2001 | Link | 43/42.24 |
| 6,601,336 B1 | * | 8/2003 | Link | 43/42.13 |
| 6,651,376 B1 | * | 11/2003 | Link | 43/42.31 |
| 7,621,070 B2 | * | 11/2009 | Brasseur | 43/44.97 |
| 2004/0000385 A1 | * | 1/2004 | Ratte | 164/76.1 |
| 2009/0114162 A1 | * | 5/2009 | Locklear | 119/256 |

FOREIGN PATENT DOCUMENTS

| | | | | |
|---|---|---|---|---|
| JP | 11196738 A | * | 7/1999 |
| JP | 2000262197 A | * | 9/2000 |
| JP | 2003125685 A | * | 5/2003 |
| JP | 2004305108 A | * | 11/2004 |

OTHER PUBLICATIONS

Machine translation of JP11196738 A from http://www19.ipdl.inpit.go.jp/PA1/cgi-bin/PA1INIT?1181685164439.*
Machine translation of JP2000262197 A from http://www19.ipdl.inpit.go.jp/PA1/cgi-bin/PA1INIT?1181685164439.*
Machine translation of JP2003125685 A from http://www19.ipdl.inpit.go.jp/PA1/cgi-bin/PA1INIT?1181685164439.*

* cited by examiner

*Primary Examiner*—Son T Nguyen
*Assistant Examiner*—Shadi Baniani
(74) *Attorney, Agent, or Firm*—D L Tschida

(57) ABSTRACT

An improved slip sinker having a hollow non-buoyant tubular body mounted intermediate a flanged head piece having a fish line receiving aperture and a weighted ballast piece. Surface projections at the head and ballast pieces mount and fasten to the bore of the tubular body. Alternative sinker configurations provide body pieces that support a ballast connector that receives mating interchangeable ballast weights. The hollow bodies of other sinkers support reflective devices, luminous materials, luminous devices, rattle pieces, granular ballast materials, scents, and/or a plug end. Profile expanding filaments can be adapted into the ballast, head or body pieces.

15 Claims, 5 Drawing Sheets

MODULAR SINKER

BACKGROUND OF THE INVENTION

The present invention relates to an improved modular fishing sinker and in particular to a snag free, sliding sinker assembly comprised of a plastic mounting eye or head piece and a weight member that respectively plug mount to opposite ends of an intermediate hollow, non-buoyant tubular member capable of supporting additional connection pieces and/or rattle pieces and/or luminous materials and/or luminous/reflective devices and/or non-buoyant ballast materials and/or scent materials among other accessory appliances.

Fishing weights can comprise any device or item that can be attached to a fishing line to submerse further attached hook(s), artificial and/or live bait. Most weights designed for attachment to a fish line are molded or formed from lead, bismuth, steel or another dense, non-corroding, economical materials that are not buoyant in water (i.e. have a specific gravity greater than that of the fish containing water).

Wide varieties of special purpose fishing sinkers have been developed for salt and fresh water fishing with differing shapes and some of which include cast apertures, channels or eyelets. Some sinkers include accessory pieces (e.g. wire form) that attach to or are molded into the sinker. Of the former types, so called "egg" type sinkers provide a longitudinal bore. Of the latter type, "bottom bouncer" type sinkers" provide an eye or eyelet at a bent wire form that receives a fish line threaded through the eye or eyelet. All of the foregoing sliding sinkers anchor and support the fish line and attached bait in sliding relation on or near the bottom of a body of water. A hook secured to the fish line supports appropriate bait such that the fish line can freely move without the drag of the sinker upon releasing the line to a "free spool" condition with a fish striking the bait and hook. Stops (e.g. knots, split shot, pegs) can be secured to the line or sinker to restrict or limit line or sinker movement.

Some sinkers are constructed as an elongated configuration that is designed to permit the sinker to slide along the bottom or glide above the bottom of the lake or water bed. The elongated design minimizes snagging of associate debris and fauna found growing from the ocean floor, lake, stream or river bed. Other attractors (e.g. slide stops, beads, spinner blades, hooks, filamentary skirts, colorized devices) can be supported to the fish line above or below the sinker.

U.S. Pat. Nos. 5,233,786; 5,243,779; 5,305,543; 5,375,365; 5,461,821; 5,531,821; 6,073,386; and 6,691,450 disclose a variety of elongated slide or "slip" mounting sinkers. Other elongated sinkers including buoyant members are shown at U.S. Pat. Nos. 6,145,240; 6,305,121; 6,484,435; and 6,874,272.

The present invention provides a novel, improved slip sinker wherein one end of a hollow tubular body mounts to a molded plastic head piece that includes an eye or aperture that receives a threaded fish line and an opposite end mounts to modular ballast pieces of differing weights. Shaped surfaces molded into the head piece and ballast piece restrain the head and ballast pieces to the tubular body to define an elongated assembly wherein a ballast piece of appropriate weight is supported to contact or glide adjacent the river bed, lake bottom or the like. Alternative sinker configurations contain luminous materials or devices, rattle pieces, and ballast materials within the body piece and/or provide a ballast connector that mounts to the body piece and receives interchangeable weights.

SUMMARY OF THE INVENTION

It is a primary object of the invention to provide a substantially snag-free slip sinker.

It is further object of the invention to provide a sinker with a molded eyelet piece having a formed fastener surface that grips the interior of a hollow body piece and an eye shaped and relieved to receive a fastener or fish line without abrasion as the line slides to and fro in the eye.

It is further object of the invention to provide an elongated, slip sinker having a hollow chamber that contains rattle members and/or luminous members and/or luminous devices and/or scent devices, and/or a molded plug end connector that attaches to mating interchangeable weights, among sundry other accessories.

It is further object of the invention to provide a slip sinker including a molded head piece and a molded ballast piece having fastener surfaces that attach to a hollow tubular body piece such as by compression within the bore of the body piece.

It is further object of the invention to provide a molded head piece with a formed fastener surface that grips the interior of a hollow body piece.

It is further object of the invention to provide a molded ballast piece with a surface formed to interconnect with the body member.

It is further object of the invention to provide a molded ballast fastener piece that permanently mounts to a hollow body piece and provides a shaped cavity that interchangeably receives modular ballast members of selective weight and shape.

It is further object of the invention to provide a molded ballast fastener or connector piece with a first surface that grips the interior of a hollow body piece and a second surface that grips and connects to a mating surface of a ballast piece.

The foregoing objects, advantages and distinctions of the invention are obtained in a presently preferred, novel, improved slip sinker wherein a hollow tubular body mounts intermediate and to a molded plastic head piece that includes an eye or aperture that receives a threaded fish line and a modular weight or ballast piece. Fastener surfaces molded into the head piece and weighted ballast piece compressively plug mount within or to the bore of the tubular body piece to define an elongated assembly wherein the weighted ballast piece is supported to contact or glide adjacent the river or lake bed.

Alternative sinker configurations provide body pieces that support a ballast connector that receives interchangeable ballast weights. The connector includes a fastener surface that plugs into and fastens to the body piece. Other connector surfaces are formed to interconnect with the ballast connector. Still other sinkers support or contain reflective, luminous materials or luminous devices, rattle pieces, ballast materials and/or an end connector piece in and/or to the bore of the body piece.

Still other objects, advantages, distinctions, constructions and combinations of individual features of the invention will become more apparent from the following description with respect to the appended drawings. The description to each combination should therefore not be literally construed in limitation of the invention. Rather, the invention should be interpreted within the broad scope of the further appended claims.

BRIEF DESCRIPTION OF THE DRAWINGS

The following figures disclose presently preferred constructions of the invention. Similar components and assemblies are referred to in the various drawings with similar alphanumeric reference characters and callouts.

DESCRIPTION OF THE PREFERRED EMBODIMENT

Figure 1:
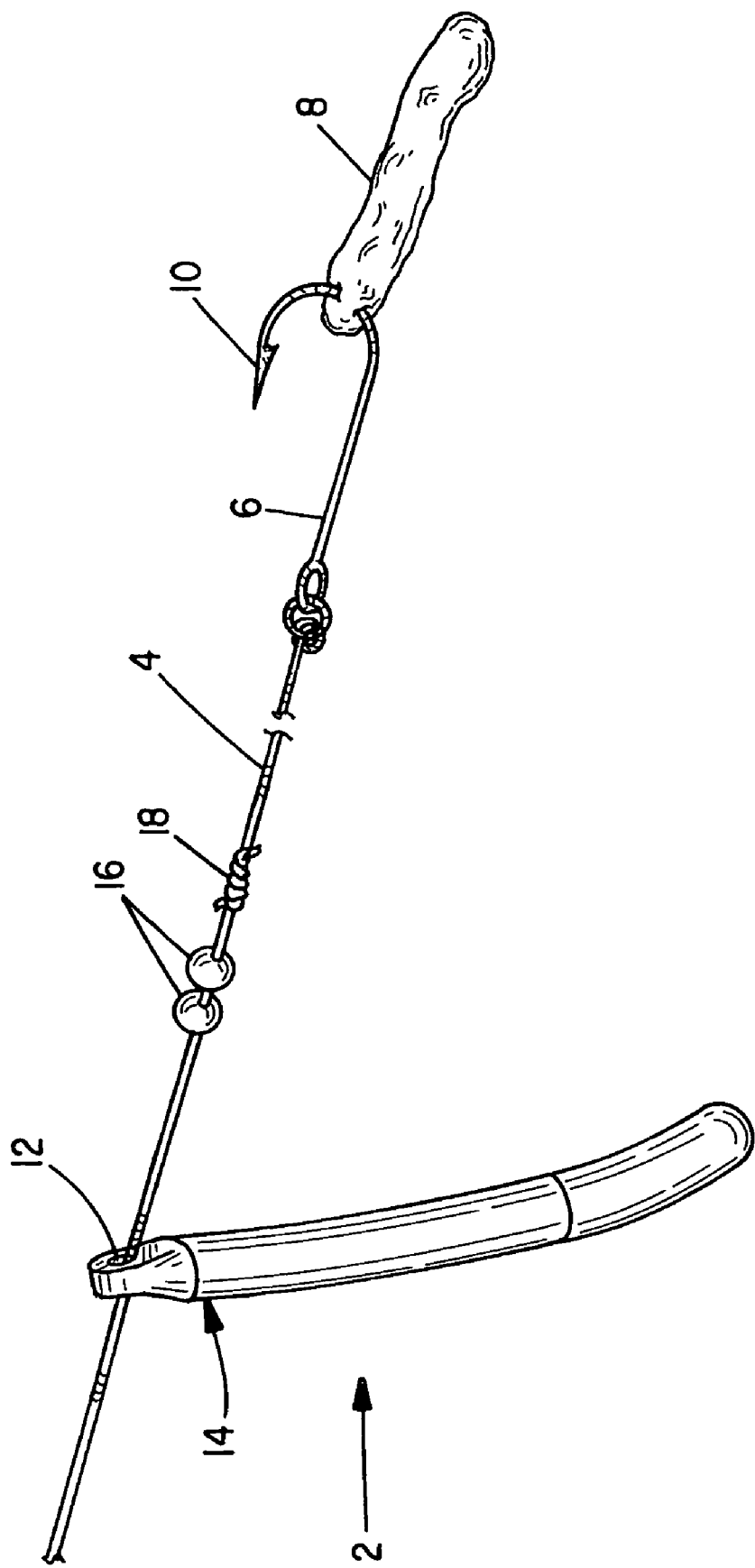
FIG. 1 is a perspective drawing showing one construction of the sinker mounted in a conventional slip sinker mounting to a fish line.

Referring to FIGS. 1 through 5, several views are shown to the construction of a novel sinker 2 of the invention outfitted with several alternative accessory pieces. A slip sinker mounting of the sinker 2 is shown at FIG. 1 and wherein the sinker 2 is mounted to slide along a fish line 4 spooled, for example, to a reel and fishing rod (not shown). Secured along the fish line 4 is a hook 6 of appropriate size and form. Live bait 8 is attached to the hook 6. The hook 6 can be constructed to any desired shape and size and can include one or more barbed ends 10. The live bait 8 can comprise any desired bait preferred by a targeted fish specie. Artificial baits 8 (e.g. flies, jigs, plug lures, spinner lures etc.) may also be secured to the fish line 4 alone or in combination with other hooks 6 and/or live bait 8.

The fish line 4 is threaded through an eye 12 of a head piece 14 fitted to the sinker 2. The sinker 2 is thereby suspended to radiate from and freely slide along the fish line 4. Beads 16 and a stop piece 18 (e.g. a knotted line piece, peg) limit the range of motion of the sinker 2. One or more of a variety of different stops 18 and/or bored beads 16 can be mounted to the fish line 4 or at the eye 12 to restrict or limit motion of the sinker 2. Other attractors of differing colors, sizes and movement actions (e.g. beads, spinner blades, feathers, filamentary skirts etc.) can also be supported in any desired combination to the fish line 4 and/or to either or both sides of the sinker 2. The attractors can add color, flash/reflection, illumination, vibration and movement to the presentation of the live or artificial bait 8.

Figure 2:
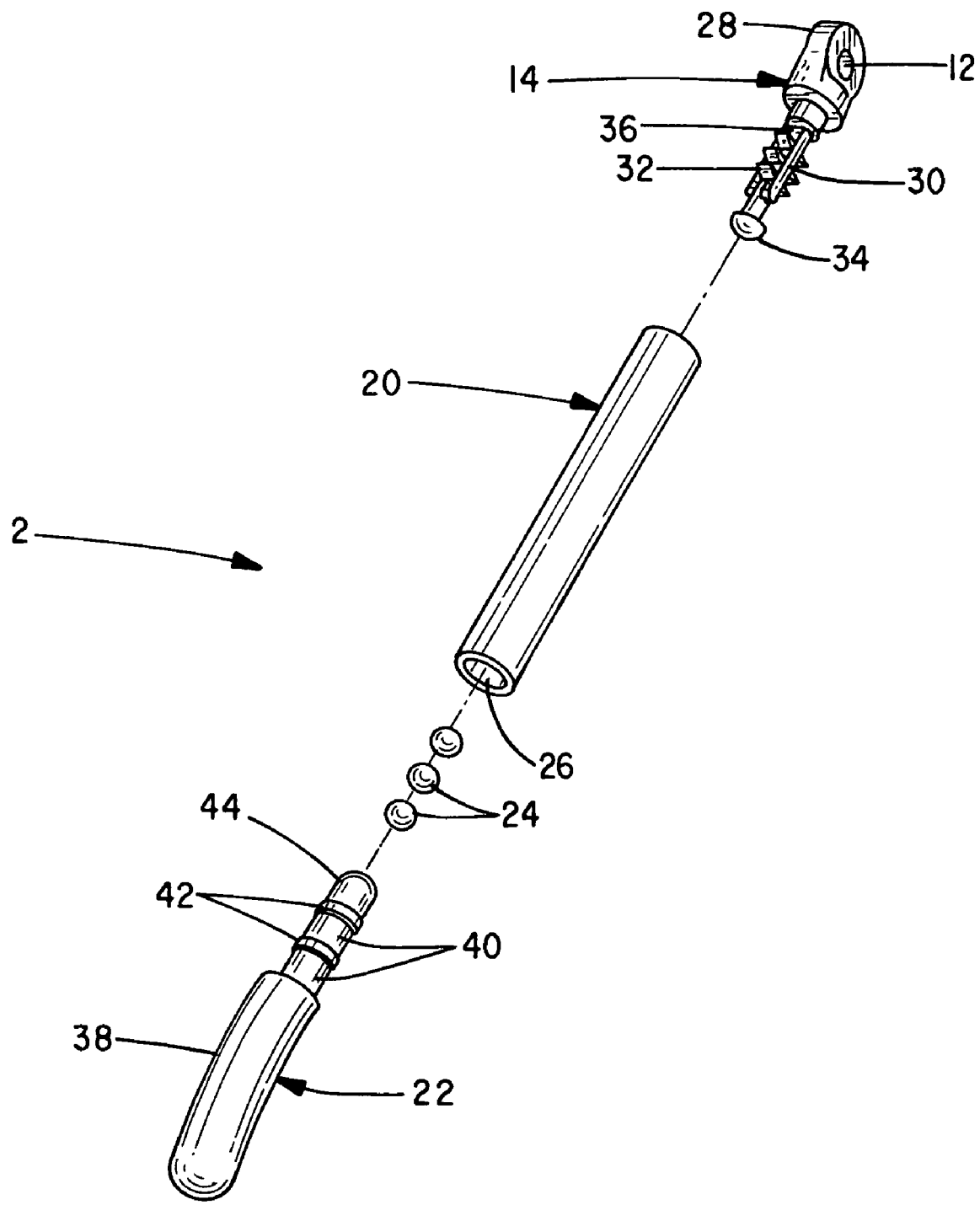
FIG. 2 is a perspective drawing shown in exploded assembly of a sinker with rattle beads mounted in the body piece.

FIG. 2 depicts the sinker 2 of FIG. 1 in a perspective exploded assembly view. The head piece or eyelet 14 is secured to one end of an intermediate tubular body piece 20. A ballast piece or molded weight 22 is secured to an opposite end of the body piece 20. A number of rattle pieces or beads 24 (e.g. metal shot or beads or other hardened members that create sound when jostled) are contained in a hollow through bore 26 of the body piece 20.

Figures 3, 4:
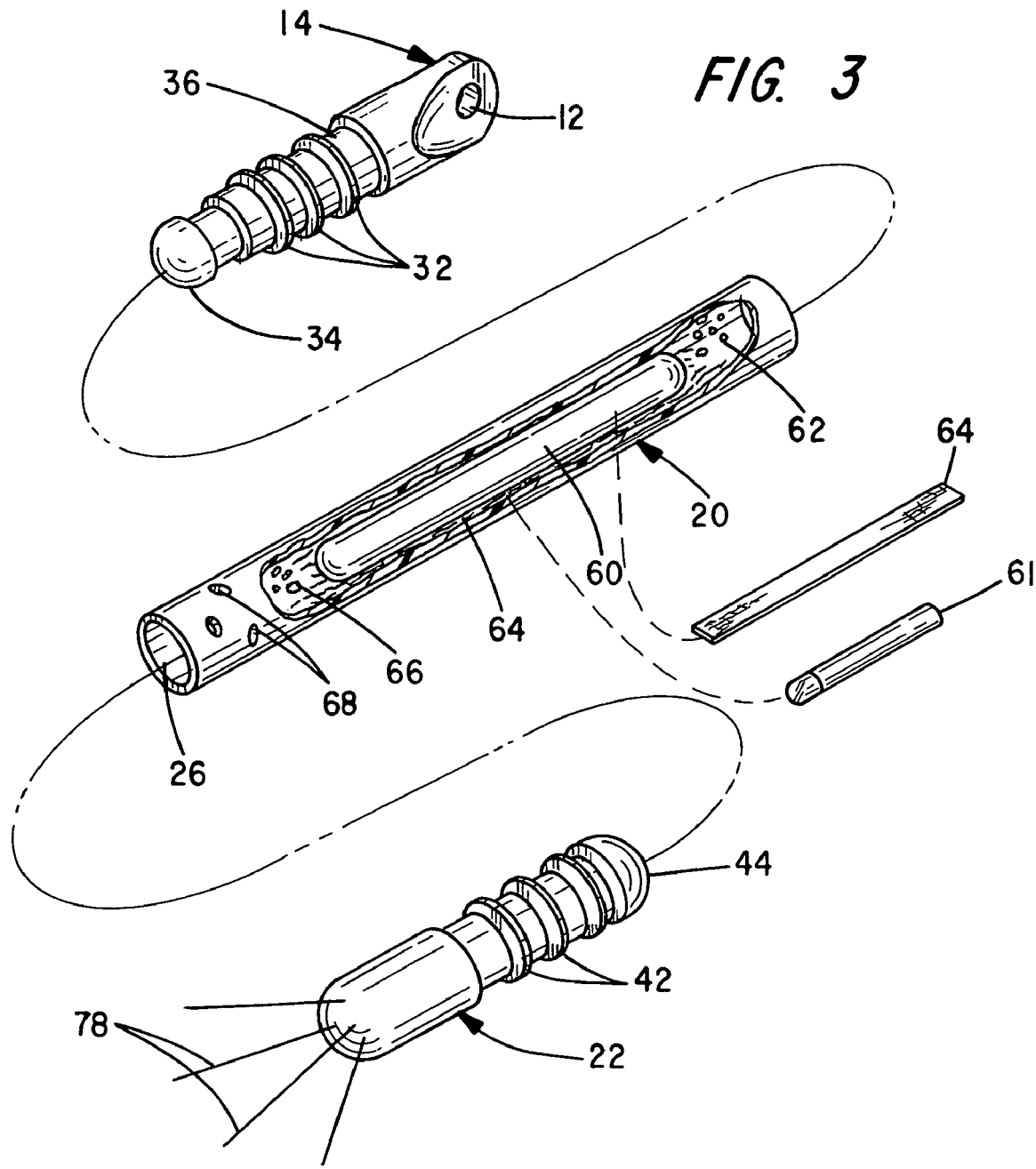
FIG. 3 is a plan drawing showing an end view of the head piece and the relief provided at the eyelet.
FIG. 4 is a perspective drawing shown in exploded assembly of a sinker with a body piece that contains luminous and/or reflective attractor devices.

With attention also directed to FIG. 3, the head piece 14 is molded from a suitable plastic or water resistant material. The aperture or eye 12 is let through a narrow arcuate portion 28 that is sufficiently narrowed or laterally relieved to permit attachment of swivels, snap fasteners or the like (not shown) to the eyelet 12. The eye 12 is also shaped to permit free movement of the line through the eye without abrasion.

A series of flat, flexible flanges 32 radiate from a stem 30 that projects aft from the eye 12 and terminates at a distal hemispherical end 34. Longitudinal ribs 36 also project from the stem 30. The belled sides of the end 34 facilitate insertion of the end 34 and stem 30 into the body piece 20. The flanges 32 and longitudinal ribs 36 maintain a secure connection between the head piece 14 and the body piece 20. Other types of projecting surfaces (e.g. ribs, filaments, barbs) or recesses can be formed into the head piece 14 to facilitate and maintain a connection.

The body piece 20 is constructed of a tubular plastic material with smooth walls that withstand abrasion and are not susceptible to stretching or breakage from normally encountered objects, snagging etc. The body piece 20 can be opaque or transparent and can be coated or colored to any preferred color or pattern. The body piece 20 can be cut to any desired length and the shape of the outer walls and/or bore can exhibit any desired geometric cross sectional size and configuration (e.g. circular, octagon, square, triangular etc.). The body piece 20 can also be bent or twisted. A variety of materials can be used to construct the body piece 20 provided they withstand UV, heat and normal conditions. The body material should also be resilient to expand and compress over the raised fastener surfaces of the head piece and ballast piece 22 upon being inserted into the body 20.

The plastic material presently used is thermally susceptible to soften and/or expand in the presence of an elevated temperature. Upon threading the stem 30 into the bore 26, the body 20 cools and compresses over the flanges 32 and ribs 36 to provide a strong connection resistant to detachment of the head piece 14. A softer, resilient material (e.g. an elastomer) can also be used that permits the head piece 14 to be withdrawn to change the body length etc. and/or add accessory pieces to the body 20.

Figure 5:
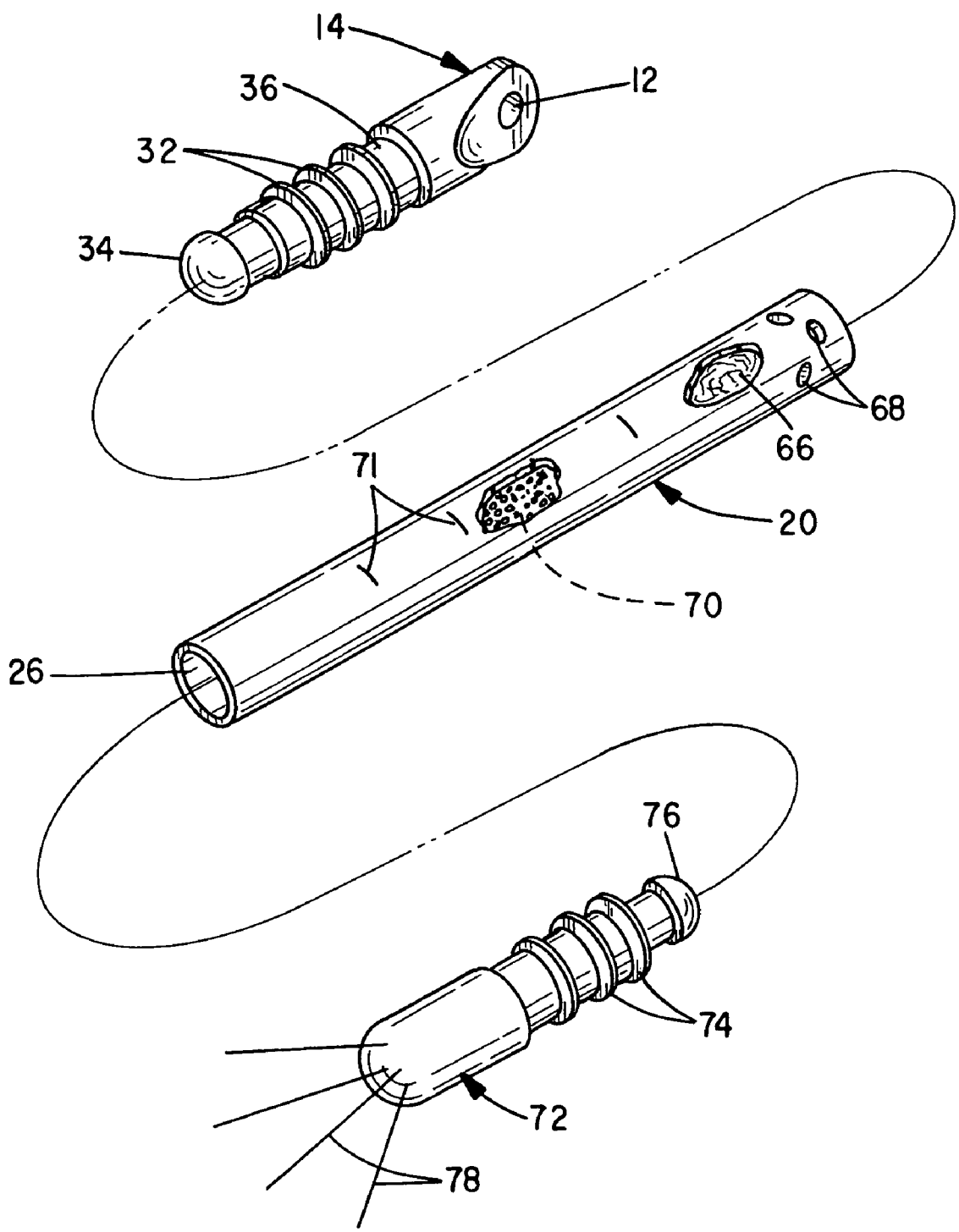
FIG. 5 is a perspective drawing shown in exploded assembly of a sinker with a body piece that contains a refillable, granular ballast material and/or a scent material and plug mounted ballast piece.

The ballast or weight piece 22 is constructed to a preferred shape and weight. A cylindrical, slightly bent (e.g. banana) shape is presently preferred. Nominal weight sizes useful for fresh water applications are ¼ to 4 ounces. The depicted cylindrical shape is preferred due to its resistance to snagging when debris, rocks, weeds etc. are encountered. The ballast or weight piece 22 is molded from relatively hard lead and normally exhibits and maintains a slight arcuate curvature 38 over the longitudinal length of the weight 22. Ballast pieces 22 of other shapes and lengths can alternatively be secured to the body piece 20. The ballast pieces 22 can also include other permanent or detachable attachments, for example, rigid filaments 78 (ref. FIG. 5), joints, cavities or attached attractors. The filaments 78 typically would be molded with the ballast piece 22 and increase the profile of the sinker 2 to prevent snagging. The filaments 78 might also be adapted into either the body 20 or head piece 14.

Formed into a narrowed diameter, concentric stem portion 40 of the ballast piece 22 are a series of raised ridges, flanges or projections 42 and a hemispherical fore end 44. The end 44 and ridges 42 facilitate mounting and retention of the ballast piece 22 to the body piece 20. Once inserted, the body piece 20 compressively grips the ridges 42 and retains the ballast piece 22 against substantially all normal conditions. Depending upon the material, the ballast piece 22 could be changed as desired by progressively shortening the body and/or heating the body 20 with a suitable heating appliance, removing the ballast 22, and inserting another weighted ballast piece 22 exhibiting a desired weight or possibly varying the amount of granular material 70 (ref. FIG. 5) or inserting a desired attractor(s) appliance into the bore 26 or to depend from the body 20.

In the latter regard, several rattle pieces 24 are retained in one construction of the sinker 2 in the hollow cavity space of the bore 26. Metal beads 24 are presently used that freely move about in the bore 26 or hollow sound chamber to create sound and vibrations that attract fish.

FIGS. 4 and 5 depict alternative materials and devices that can be secured in the bore 26. FIG. 4 depicts a transparent body piece 20 that alternatively supports a luminous member 60 (e.g. a cylume glow stick, battery powered LED light assembly), a luminous granular material 62 or ribbon or reflective/colored filamentary members 64. The luminous members 61 and 64 are shown mounted and removed from the bore 26. The luminous and reflective members 60, 61, 62, and 64 enhance visual attraction properties to the body 20.

The body 20 might also include a scented material 66 and apertures 68 at the sidewalls to permit the scent to escape. The luminous and reflective members 60, 61, 62, and 64 and scent material 66 can be added and/or changed as necessary upon removing and reattaching the head piece 14 or ballast piece 22 as discussed above. The luminous material/device 60, 61 and 62 may also be selected to be water activated and illuminate only in the presence of water.

FIG. 5 depicts another ballasting arrangement of the sinker 2 and wherein the bore 26 is filled with a granular or other relatively high specific gravity material 70 (e.g. lead shot, sand, split shot). Indicia marks 71 can be provided along the body 20 to convey information to weighting depending upon the length of the body 20 (e.g. 1/16 to 1½ ounces). A lightweight plug end 72 constructed of plastic or a heavy weighted plug 72 molded from lead or other weighted material and having ridges 74 and a tapered or belled end 76 can be used to secure the weighted material 70 to the body. The plug end 72 may also include a shaped surface, bore or cavity to interconnect to other ballast pieces or attractors.

The plug end 72 might also include several resilient, flexible, filamentary members 78 that project to prevent the sinker 2 from becoming snagged in crevices, rocks and the like. It is to be appreciated the filamentary members 78 might also be molded into the ballast pieces 22 of FIG. 1, 2 or 4. The body piece 20 might also include apertures 68 to activate a luminous material or device 62, 61 or permit the release of scent 66 placed in the bore 26.

Figure 6:
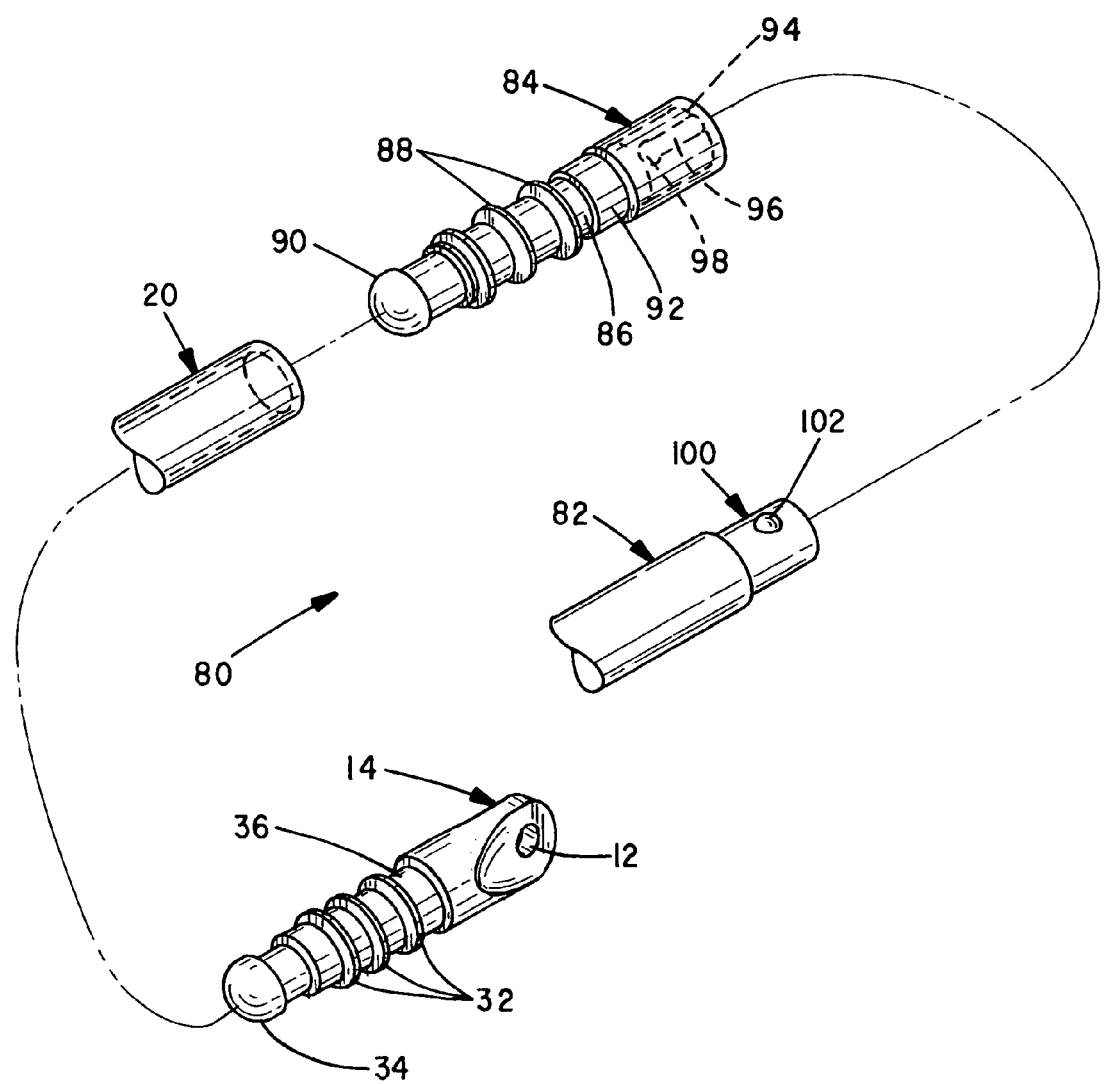
FIG. 6 is a perspective drawing showing an exploded assembly a sinker with a body piece that supports a ballast connector and an interchangeable ballast piece having a mating interlocking surface.

FIG. 6 depicts an exploded assembly drawing to another alternative sinker 80 wherein a ballast piece 82 of suitable weight, size, shape and length is interchangeably or detachably secured to a ballast connector piece 84 that attaches to a suitable body piece 20 and head piece 14. The ballast connector 84 provides a stem 86 that supports a number of radiating flanges or projections 88. A hemispherical head portion 90, flanges 88 and shoulder 92 exhibit diameters slightly oversized to the diameter of the bore 26 to facilitate the fitting of the connector 84 to the body piece 20 and the compression of the sidewalls of the body piece 20 around the flanges 88, head and shoulder 92.

Formed into the aft end of the ballast connector 84 is a cavity or bore 94. A longitudinal keyway 96 and cavity 98 communicate with the bore 94 and receive a mating and interconnecting stem 100 of the ballast piece 82. A key fastener or projection 102 at the stem 100 slides along the keyway 96 and fastens within the cavity 98. The keyway 96 and cavity 98 can be constructed to provide a suitable interconnection (e.g. snap-action, twist action or compression fit). Threads might also be provided at the stem 100 to mate with a threaded surface at the bore 94. Still other suitable interchangeable fastenings can be included as desired. Collectively the connector 84 permits the selective interchanging of the ballast piece 82 to the body piece 20.

While the invention is shown and described with respect to a presently preferred sinker assembly and several considered improvements, modifications and/or alternatives thereto, still other sinker assemblies and arrangements may be suggested to those skilled in the art. It is also to be appreciated that the singular features of the sinker can be arranged in different combinations. The foregoing description should therefore be construed to include all those embodiments within the spirit and scope of the following claims.

What is claimed is:

1. A fishing sinker attachable to a fishing line comprising:
   a) a unitary head piece having an end portion and a trailing stem portion, wherein a bored aperture transversely extends through said end portion for supporting said head to radiate from a fishing line inserted through said bore and wherein said stem portion includes a plurality of fastener pieces that project from sidewalls of the stem portion;
   b) an elongated, solid ballast piece exhibiting a weight substantially greater than the specific gravity of water and having an end portion that includes a key fastener that projects from sidewalls of the end portion;
   c) an elongated, non-buoyant, non-porous tubular body piece having a longitudinal through bore, wherein said stem portion of the head piece mounts inside one end of said through bore such that said fastener pieces interconnect said head piece to said body piece, and wherein said body piece includes a keyway adapted to align and interconnect with the key fastener such that the ballast piece interconnects with said body piece to interchangeably vary the gross weight of said sinker; and
   d) attractor means retained in the through bore of said body piece by and between said head piece and ballast piece for attracting fish.

2. A fishing sinker as set forth in claim 1 wherein said attractor means comprises a plurality of beads that emit audible sounds upon striking walls of said body piece and each other with movement of the sinker through water.

3. A fishing sinker as set forth in claim 1 wherein said attractor means comprises a luminescent granular material.

4. A fishing sinker as set forth in claim 1 wherein said attractor means comprises a luminescent member that electrically or chemically emits light.

5. A fishing sinker as set forth in claim 1 wherein said attractor means comprises a light reflective member.

6. A fishing sinker as set forth in claim 1 wherein said body piece includes a plurality of fill indicia indicative of weight and including a granular material having a specific gravity greater than water mounted in the through bore of said body piece and filled to align with one of said indicia to selectively vary the gross weight of said sinker.

7. A fishing sinker as set forth in claim 1 including a plurality of rigid filamentary members that radially project from the ballast piece sufficiently to prevent said sinker from snagging obstructions encountered in a waterway.

8. A fishing sinker as set forth in claim 1 wherein a hemispherical surface radially projects from a distal end of said stem portion and couples to the body piece.

9. A fishing sinker as set forth in claim 1 wherein said body piece comprises a cylindrical, compressively resilient material.

10. A fishing sinker attachable to a fishing line comprising:
    a) a unitary head piece having an end portion and a trailing stem portion, wherein a bored aperture transversely extends through said end portion for supporting said head to radiate from a fishing line inserted through said bore and wherein said stem portion includes a plurality of fastener pieces that project from sidewalls of the stem portion;

b) a ballast connector having a fastener surface and including a keyway;

c) an elongated, compressively resilient, non-porous tubular body piece having a through bore, wherein said stem piece mounts inside one end of said through bore and the fastener surface of the ballast connector mounts inside an opposite end of the through bore, and wherein walls of said body piece compressively secure said head piece and ballast connector of the body piece; and d) a ballast piece exhibiting a weight substantially greater than the specific gravity of water and having an end portion that includes a key fastener that projects from sidewalls of the end portion and aligns with the keyway to interconnect said ballast piece to said ballast connector and whereby the gross weight of said sinker can be interchangeably varied; and e) a plurality of beads mounted inside the through bore that emit audible sounds upon striking walls of said body piece and each other with movement of the sinker through water.

11. A fishing sinker as set forth in claim 10 including a plurality of rigid filamentary members that radially project from the sidewalls of the ballast piece sufficiently to prevent said sinker from snagging obstructions encountered in a waterway.

12. A fishing sinker attachable to a fishing line comprising:

a) a unitary head piece having an end portion and a trailing stem portion, wherein a bored aperture transversely extends through the end portion for supporting said head to radiate from a fishing line inserted through said bore, wherein the stem portion includes a plurality of fastener pieces that project from sidewalls of said stem portion;

b) an elongated, solid ballast piece exhibiting a weight substantially greater than the specific gravity of water and having an end portion that includes a key fastener that projects from said end portion;

c) an elongated, compressively resilient, non-porous tubular body piece having a through bore, wherein the stem portion of the head piece mounts inside one end of said through bore such that the fastener pieces compressively interconnect said head piece to said body piece, wherein said body piece includes a keyway adapted to align with the key fastener of said ballast piece such that the ballast and body piece interconnect and whereby the gross weight of said sinker can be interchangeably varied; and d) a plurality of beads mounted inside the through bore to emit audible sounds with movement of the sinker through water.

13. A fishing sinker as set forth in claim 12 a luminescent material is mounted in the bore of said body piece.

14. A fishing sinker as set forth in claim 12 wherein said body piece includes a plurality of indicia markings indicative of weight and wherein at least one of the head piece or ballast pieces is detachable from said body piece for selectively varying the quantity of granular material relative to said indicia markings.

15. A fishing sinker as set forth in claim 12 including a plurality of rigid filamentary members that radially project from the sidewalls of the ballast piece sufficiently to prevent said sinker from snagging obstructions encountered in a waterway.

* * * * *